United States Patent
Lai et al.

[11] Patent Number: 5,871,650
[45] Date of Patent: *Feb. 16, 1999

[54] SUPPORTED ZEOLITE MEMBRANES WITH CONTROLLED CRYSTAL WIDTH AND PREFERRED ORIENTATION GROWN ON A GROWTH ENHANCING LAYER

[75] Inventors: Wenyih Frank Lai, Fair Lawn; Harry William Deckman, Clinton; James Alexander McHenry, Washington, all of N.J.; Johannes Petrus Verduijn, Leefdaal, Belgium

[73] Assignee: Exxon Research and Engineering Company, Florham Park, N.J.

[ * ] Notice: The term of this patent shall not extend beyond the expiration date of Pat. No. 5,716,527.

[21] Appl. No.: 272,361

[22] Filed: Jul. 8, 1994

[51] Int. Cl.$^6$ .................................................. B01D 61/00
[52] U.S. Cl. ......................... 210/653; 210/651; 210/490; 210/500.25; 210/506; 427/247; 96/11; 95/50; 95/55; 585/818
[58] Field of Search ..................... 210/490, 650, 210/500.15, 500.1, 500.21, 510.1, 651, 500.26, 500.25, 653, 506; 427/247; 502/4; 585/818; 95/50, 55; 96/8, 11

[56] References Cited

U.S. PATENT DOCUMENTS

| | | | |
|---|---|---|---|
| 3,244,643 | 4/1966 | Schwartz | 252/455 |
| 4,571,443 | 2/1986 | DiCosimo et al. | 585/428 |
| 4,631,267 | 12/1986 | Lachman et al. | 502/439 |
| 4,631,268 | 12/1986 | Lachman et al. | 502/439 |
| 4,631,269 | 12/1986 | Lachman et al. | 502/439 |
| 4,657,880 | 4/1987 | Lachman et al. | 502/64 |
| 4,699,892 | 10/1987 | Suzuki | 502/4 |
| 4,716,136 | 12/1987 | Weisz et al. | 502/64 |
| 4,800,187 | 1/1989 | Lachman et al. | 502/64 |
| 4,827,071 | 5/1989 | Hazbun | 585/443 |
| 4,860,584 | 8/1989 | Mercer et al. | 73/336.5 |
| 4,876,890 | 10/1989 | Mercer et al. | 73/336.5 |

(List continued on next page.)

FOREIGN PATENT DOCUMENTS

| | | |
|---|---|---|
| 1235684 | 4/1988 | Canada . |
| 2016960AA | 11/1990 | Canada . |
| 1040152 | 3/1990 | China . |
| 0135069A2 | 3/1985 | European Pat. Off. . |
| 0180200A2 | 5/1986 | European Pat. Off. . |
| 0188182A1 | 7/1986 | European Pat. Off. . |
| 0228885A2 | 7/1987 | European Pat. Off. . |
| 0324675A1 | 7/1989 | European Pat. Off. . |
| 0336241A2 | 10/1989 | European Pat. Off. . |
| 0344011A1 | 11/1989 | European Pat. Off. . |

(List continued on next page.)

OTHER PUBLICATIONS

Synthesis and characterization of a pure zeolitic membrane, Tsikoyiannis and Haag, Zeolites, 1992, vol. 12, Feb., pp. 126–130.

*Primary Examiner*—Ana Fortuna
*Attorney, Agent, or Firm*—Estelle C. Bakun

[57] ABSTRACT

The present invention is directed toward a new zeolite membrane which exhibits a columnar cross-sectional morphology and preferred crystallographic orientation comprising a porous substrate having coated thereon a mesoporous growth enhancing layer and a layer of columnar zeolite crystals on said mesoporous growth enhancing layer, and wherein said mesoporous growth enhancing layer comprises nanocrystalline or colloidal sized zeolites, nanocrystalline or colloidal zeolite and metal oxide, or nanocrystalline or colloidal zeolite and colloidal metal, or nanocrystalline or colloidal zeolite, colloidal metal and metal oxide, and wherein said mesoporous growth enhancing layer has interstices of about 20 to about 2000 Å, and wherein said columnar zeolite layer is a polycrystalline layer wherein 99.9% of said columnar zeolite crystals have at least one point between adjacent crystals that is $\leq 20$ Å. The invention is further directed to a process of producing a zeolite membrane exhibiting a columnar crystallographic orientation.

26 Claims, 7 Drawing Sheets

U.S. PATENT DOCUMENTS

| | | |
|---|---|---|
| 4,904,518 | 2/1990 | Mercer et al. .......................... 428/195 |
| 4,925,459 | 5/1990 | Rojey et al. ............................. 155/16 |
| 4,927,768 | 5/1990 | Coughlin et al. ...................... 436/172 |
| 4,968,430 | 11/1990 | Hildenbrand et al. ................. 210/640 |
| 4,973,606 | 11/1990 | Sterzel et al. ............................ 521/27 |
| 4,981,676 | 1/1991 | Minet et al. ............................ 423/652 |
| 4,990,714 | 2/1991 | Nemett-Mavrodin .................. 585/407 |
| 5,019,263 | 5/1991 | Haag et al. ........................ 210/500.25 |
| 5,069,794 | 12/1991 | Haag et al. ............................. 210/650 |
| 5,100,596 | 3/1992 | Haag et al. ............................... 264/42 |
| 5,110,478 | 5/1992 | Haag et al. ............................. 210/650 |
| 5,143,614 | 9/1992 | Soria et al. ........................ 210/321.61 |
| 5,248,643 | 9/1993 | Patil et al. ................................. 502/67 |
| 5,258,339 | 11/1993 | Ma et al. ..................................... 502/4 |
| 5,260,242 | 11/1993 | Dunne et al. ............................. 502/63 |
| 5,266,542 | 11/1993 | Hashimoto et al. ...................... 502/64 |
| 5,362,522 | 11/1994 | Barri et al. .............................. 427/435 |
| 5,716,527 | 2/1998 | Deckman et al. ...................... 210/490 |

FOREIGN PATENT DOCUMENTS

| | | |
|---|---|---|
| 0398093A2 | 11/1990 | European Pat. Off. . |
| 0442410A1 | 8/1991 | European Pat. Off. . |
| 0460512A1 | 12/1991 | European Pat. Off. . |
| 0476363A1 | 3/1992 | European Pat. Off. . |
| 0481658A1 | 4/1992 | European Pat. Off. . |
| 0481659A1 | 4/1992 | European Pat. Off. . |
| 0481660A1 | 4/1992 | European Pat. Off. . |
| 0511739A1 | 11/1992 | European Pat. Off. . |
| 0536995A1 | 4/1993 | European Pat. Off. . |
| 0570842A1 | 11/1993 | European Pat. Off. . |
| 2079460 | 11/1971 | France . |
| 3827049 | 2/1990 | Germany . |
| 4029433 | 3/1992 | Germany . |
| 63-287504 | 11/1984 | Japan . |
| 60-28826 | 3/1985 | Japan . |
| 60-129119 | 7/1985 | Japan . |
| 3262523 | 11/1991 | Japan . |
| 2190397A | 11/1987 | United Kingdom . |
| WO9213631 | 8/1992 | WIPO . |
| WO9219574 | 11/1992 | WIPO . |
| WO9300155 | 1/1993 | WIPO . |
| WO9317781 | 9/1993 | WIPO . |
| WO9319840 | 10/1993 | WIPO . |
| WO9319841 | 10/1993 | WIPO . |
| WO9401209 | 1/1994 | WIPO . |
| WO9401365 | 1/1994 | WIPO . |

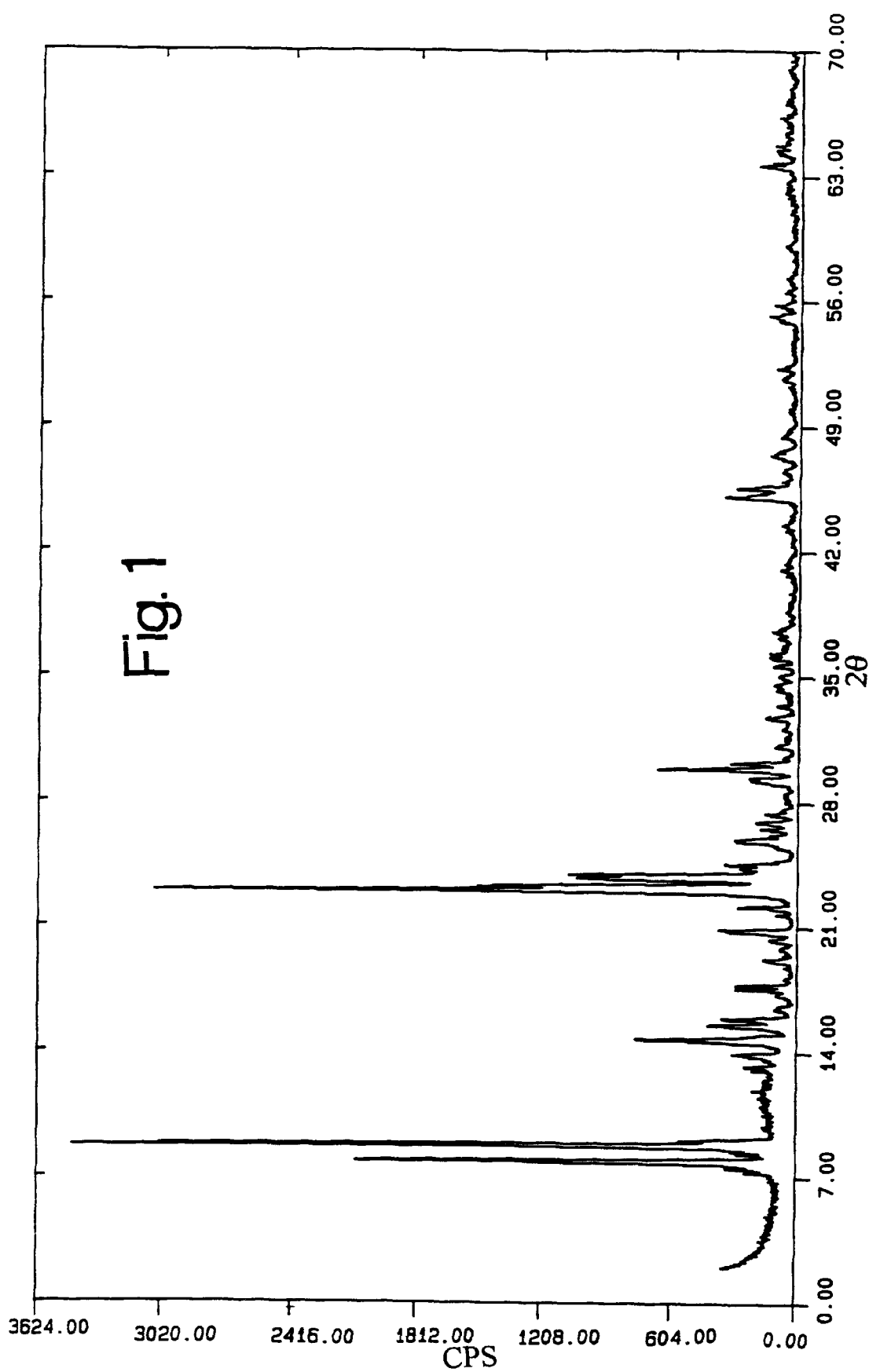

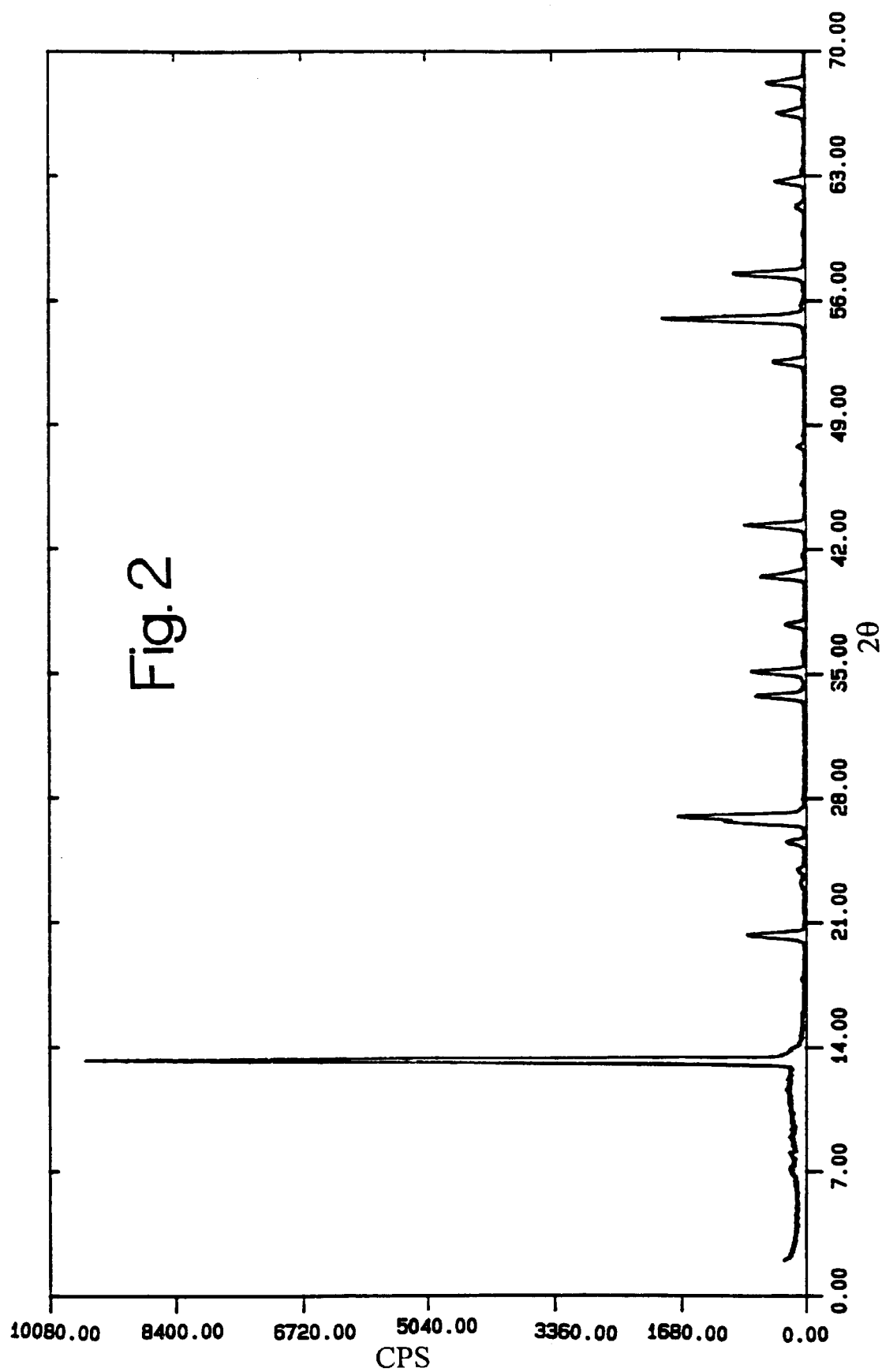

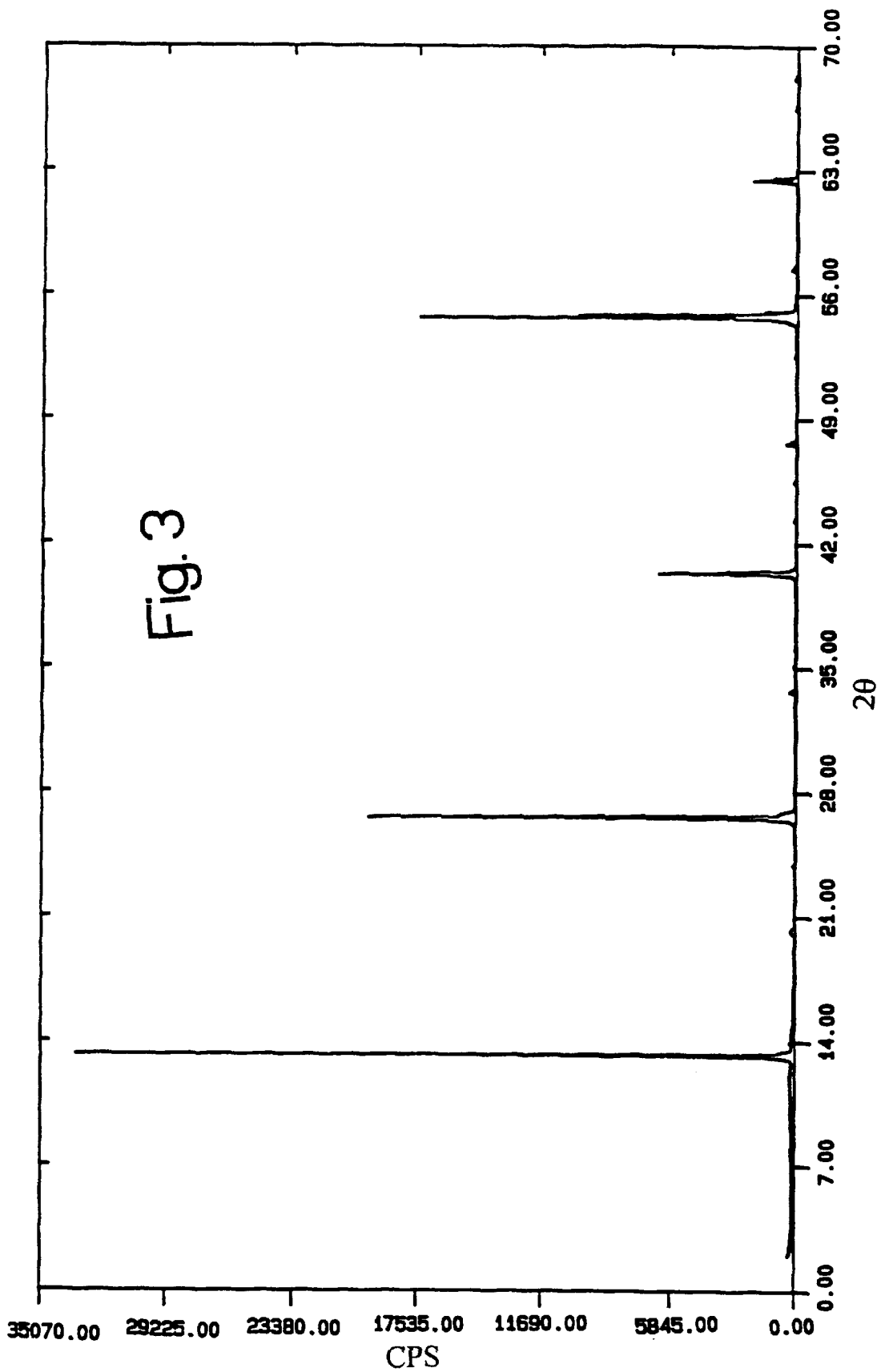

SUPPORTED ZEOLITE MEMBRANES WITH CONTROLLED CRYSTAL WIDTH AND PREFERRED ORIENTATION GROWN ON A GROWTH ENHANCING LAYER

FIELD OF THE INVENTION

The present invention is directed toward a supported zeolite membrane with columnar cross-sectional morphology and crystallographic preferred orientation of crystals.

BACKGROUND OF THE INVENTION

Zeolite membranes have long been a goal of separation science. For a zeolite membrane to be practical, it must have a high flux as well as selectivity. Obtaining such a membrane has been difficult in the past because of defects in the zeolite film. This has been especially true for membranes grown from low alkaline synthesis routes described in the literature. These membranes have a heterogeneous crystal structure in the membrane and require an enormous (>50 micron) layer thickness to seal pinholes and void structures. What is needed in the art is a thin zeolite membrane with very few defects.

A patent describing the direct synthesis of zeolite membranes has been issued to W. Haag and J. G. Tsikoyiannis of Mobil (U.S. Pat. No. 5,110,478, issued May 5, 1992). A paper describing scientific results obtained with this type of membrane was published in an article titled "Synthesis and Characterization of a Pure Zeolitic Membrane" by J. G. Tsikoyiannis and W. Haag in Zeolites (Vol. 12, p. 126, 1992). The membrane described in the above article and patent is used as a freestanding membrane and is not affixed or attached as a layer to a microporous support making it mechanically fragile and leading to ready breakage during use. The physical structure of the membrane is such that there is a gradient of crystal sizes across the thickness of the membrane. This gradient of crystal sizes throughout the layer thickness precludes growth of a thin membrane with a minimum number of non-selective permeation paths.

Zeolites have also been grown on supports. See, for example, "High temperature stainless steel supported zeolite (MFI) membranes: preparation, module construction and permeation experiments," E. R. Geus, H. van Bekkum, W. Bakker and J. Moulijin, Microporous Materials, Vol. 1, p. 137, 1993; Netherlands patent application 9011048; European patent application 91309239.1 and U.S. Pat. No. 4,099,692.

All of the above prepared membranes are formed with several zones (larger crystals grown on top of smaller crystals) across the membrane thickness. In several zones, the crystals are not grown into a dense mat that is free of intercrystalline voids. To obtain a permselective zeolite membrane, the above zeolite layers (comprised of zones) must be grown to an excessive thickness (>50 microns) to seal off voids and defects within the membrane. This creates a great mass transfer resistance causing reduced flux. Obtaining functional zeolite membranes from high alkaline synthesis routes is difficult because the heterogenous crystals in the membrane require an enormous membrane thickness to seal pinholes and void structures which lowers the membrane selectivity. The presence of such pinholes and voids is the cause of optical scattering in as synthesized high alkaline membranes.

BRIEF DESCRIPTION OF THE DRAWINGS

FIGS. 1 and 2 show the x-ray diffraction patterns of silicalite powder and a membrane comprising a porous support having coated thereon a growth enhancing layer, and a zeolite layer grown on the growth enhancing layer, wherein the growth enhancing layer was inverted, as described herein, during growth of the zeolite layer. The x-axis are 2 theta and the y-axis are intensity in CPS.

FIG. 3 shows the x-ray diffraction pattern for a zeolite membrane of the instant invention grown on an alumina substrate. The y-axis is intensity in CPS and the x-axis is diffraction angle in degrees 2θ.

SUMMARY OF THE INVENTION

Figure 4A:
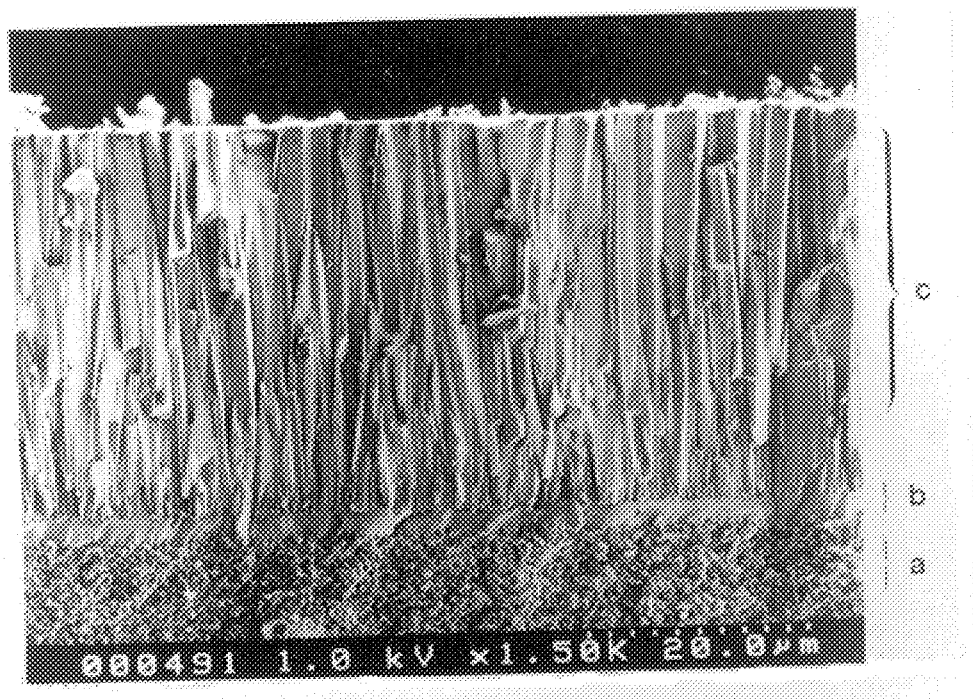
FIG. 4(a) shows a scanning electron micrograph of the morphology of a MFI zeolite layer, a Growth Enhancing Layer, and a porous substrate in accordance with the instant invention which was fractured to reveal a cross section. The layer labeled (A) is the porous substrate formed of α-alumina with 800 Å pores. The layer labeled (B) is the GEL layer which is mesoporous and clearly discernible in the micrograph. The layer labeled (C) contains MFI zeolite crystals which are intergrown together in a dense mat. The columnar nature of the zeolite crystals is readily apparent from the morphology of the fracture surface through the zeolite layer. The layer (C) is free of voids and defects.

One aspect of the present invention is directed toward a new zeolite membrane which exhibits a columnar cross-sectional morphology and preferred crystallographic orientation comprising a porous substrate having coated thereon a mesoporous growth enhancing layer and a layer of columnar zeolite crystals on said mesoporous growth enhancing layer, and wherein said mesoporous growth enhancing layer comprises zeolites, zeolite and metal oxide, zeolites and metal particles, or zeolites, metal particles and metal oxides, wherein said zeolites are selected from the group consisting of nanocrystalline zeolites and colloidal sized zeolites, and wherein said mesoporous growth enhancing layer has interstices of about 20 to about 2000 Å, and wherein said columnar zeolite layer is a polycrystalline layer wherein 99% of said columnar zeolite crystals have at least one point between adjacent crystals that is $\leq 20$ Å.

The invention is further directed to a process of producing a zeolite membrane exhibiting a columnar crystallographic orientation comprising:

(a) coating a substrate with a growth enhancing layer wherein said growth enhancing layer is prepared by utilizing a solution comprising distilled water with zeolite, zeolite and metal oxide, zeolite and colloidal metal or zeolite, colloidal metal and metal oxide, and wherein said zeolite is selected from the group consisting of nanocrystalline and colloidal zeolite and wherein said metal oxide is colloidal metal oxide or polymeric metal oxide prepared by sol-gel processing, followed by calcination at a temperature of about 200° to about 1000° C. for about at least about 2 hours;

(b) immersing said porous substrate having said growth enhancing layer coated thereon in a zeolite synthesis mixture;

(c) autoclaving said substrate and zeolite synthesis mixture for a time and a temperature sufficient to form a columnar zeolite layer on said growth enhancing layer, and wherein settling of particles produced from said zeolite synthesis mixture during autoclaving, onto said columnar zeolite layer is prevented;

(d) washing said substrate having said growth enhancing and columnar zeolite layers thereon with a solution comprising water for a time and at a temperature sufficient to remove unreacted zeolite synthesis mixture, to form a membrane.

The process further comprises step (e) calcining said membrane when said zeolite synthesis mixture contains an organic template for a time and at a temperature sufficient to remove said organic template.

Industrially viable zeolite membranes, such as those of the instant invention, have a large number of applications in separations. For example, they may be used in separation of $CO_2$ from methane, water alcohol separations, hydrogen recovery, xylenes separation, and several other molecular separations. The instant membranes prepared on non-porous supports are useful as sensors.

DETAILED DESCRIPTION OF THE INVENTION

The present invention describes a new type of supported zeolite membrane which has a columnar cross-sectional morphology (see FIG. 4, Views (a) and (b)) formed by crystallographiclly oriented zeolite crystals formed on the surface of a growth enhancing layer (GEL) that contains nanocrystalline or colloidal sized zeolites, mixtures of colloidal sized or nanocrystalline zeolites and metal oxides, mixtures of colloidal sized or nanocrystalline zeolite and colloidal sized metal and mixtures of colloidal sized or nanocrystalline zeolite, colloidal sized metal and metal oxide. Hence, the growth enhancing layer and the columnar zeolite layer contain zeolite, but each is a distinct layer. The columnar cross-sectional morphology of the columnar zeolite layer is such that there are essentially no voids extending through the thickness of the layer because the columnar crystals are grown into a polycrystalline dense mat. Dense mat as used herein means that at least 99%, preferably 99.9% of the columnar zeolite crystals have at least one point between adjacent crystals that is $\leq 20$ Å. In the instant invention, the spacing between crystals is set by a grain boundary zone and the maximum grain boundary zone spacing, absent voids or defects, will be $\leq 40$ Å and such spacings are readily observable by transmission electron microscopy and may contain inorganic oxide material. As used herein, a grain boundary zone is defined as the width of the disordered zone between two adjacent ordered crystals.

The dense mat of columnar zeolite crystals is intergrown in the membrane so that non-selective permeation paths through the membrane are blocked by the narrowest point of approach between crystals. Non-selective permeation pathways are permeation pathways which exist at room temperature that do not pass through the zeolite crystals. This blockage of nonpermeation pathways exists at room temperature after a template which occludes the pore structure is removed from the zeolite crystals. Templates which are used to grow the zeolite are often removed by a calcination step. From transmission electron microscopy (TEM) investigations, the narrowest point of approach between crystals of less than 20 Å after the template is removed, can be established. The space between crystals at this point can contain inorganic oxide material that restricts non-selective permeation of molecules through the membrane. The absence of non-selective permeation paths can be detected by the ability to prevent the permeation at room temperature (~20° C.) of dye molecules through the membrane after any template is removed from the pore structure. Dye molecules which can be chosen to detect non-selective permeation pathways through the membrane should have minimum dimensions which are larger than the controlling aperture through the zeolite and the size of the dye molecule should also be less than 20 Å. Non-selective pathways transport dye molecules which are larger than the pore size of the zeolite. The dye molecules should be carried in a solution made with a solvent which can be transported through the zeolite pore structure and the zeolite layer should not be allowed to pick up foreign contaminants (such as water) before being tested. It is found that the zeolite membranes made in accordance with the present invention block the permeation of dye molecules at room temperature through the zeolite layer. All of the dye molecules chosen have at least one dimension less than approximately 20 Å. The lack of permeation at room temperature of dye molecules with sizes less than approximately 20 Å demonstrates that non-selective permeation pathways with sizes less than approximately 20 Å are blocked. It should be noted that this test does not have to be performed with a dye molecule and any molecular species that can be detected having a size less than 20 Å and greater than the zeolite pore dimension can be used. The advantage of using a dye molecule is that it can be readily detected by optical means.

The columnar zeolite layer is grown on top of a mesoporous growth enhancing layer (GEL) layer which contains colloidal sized or nanocrystalline zeolites. The growth enhancing layer smooths the porous support, facilitates the growth of zeolite layer and provides a seeding surface to increase the nucleation density of zeolite crystals formed on the support. This growth enhancing layer has to be chemically and mechanically stable in hydrothermal synthesis conditions and the colloidal sized or nanocrystalline zeolites contained in it serve as nucleation sites for growth of the columnar zeolite layer. Altering the density of nucleation sites alters the way the zeolite layer grows which determines zeolite crystal size, packing (i.e., voids and defects), and crystal morphology.

Figure 6:
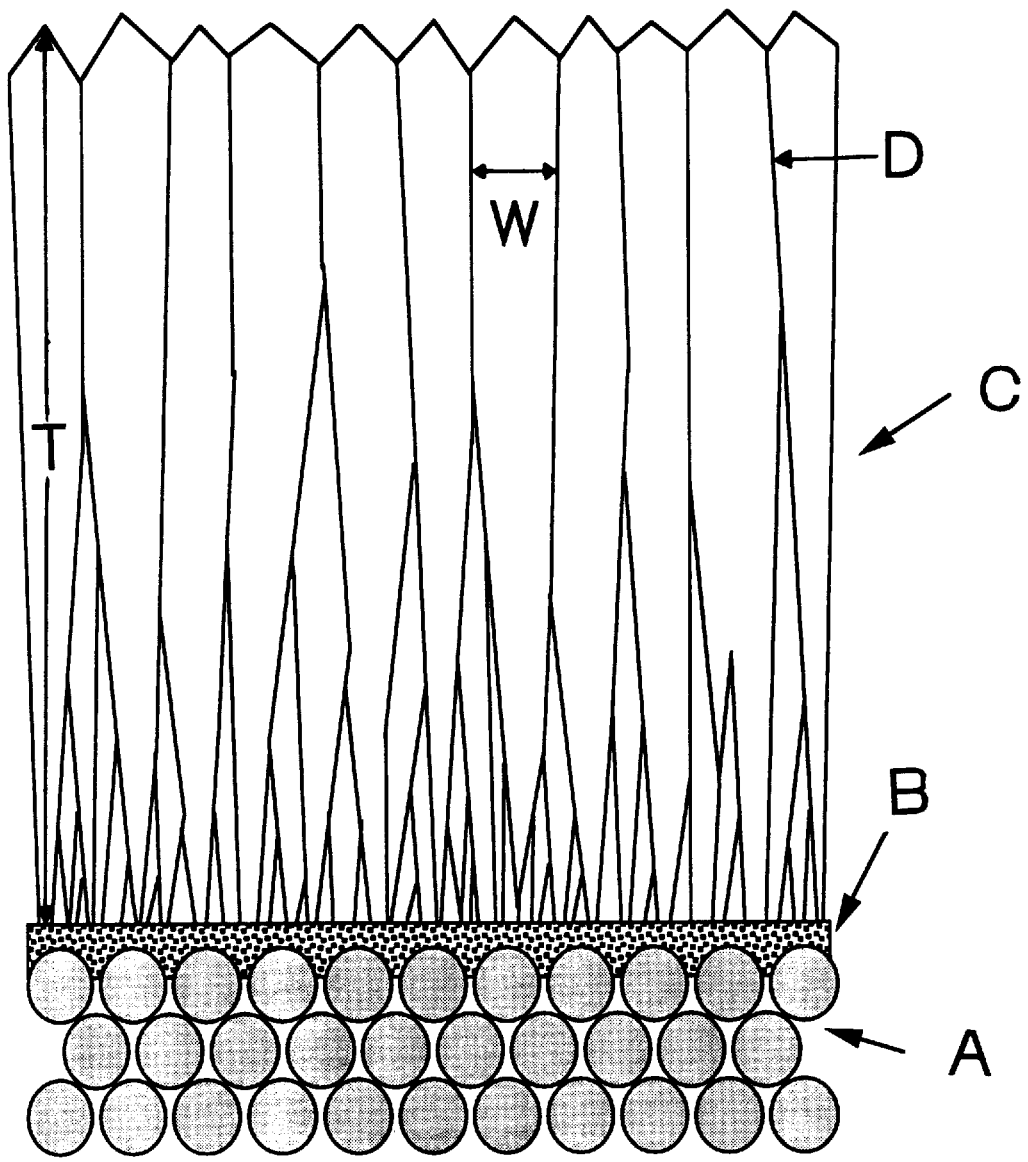
FIG. 6 is a schematic view of the cross-sectional morphology, described herein, of the instant membranes. (A) is the porous substrate, (B) the growth enhancing layer, (C) a zeolite layer, (D) a grain boundary, (T) the thickness of one zeolite crystal, and (W) the width of a zeolite crystal at one point on the crystal.

The GEL layer contains identifiable particles with interstices between said particles of zeolites, zeolites and metal oxides, zeolite and colloidal sized metal and zeolite, colloidal sized metal and metal oxide. Said interstices are mesoporous and have sizes of about 20 to about 2000 Å, preferably from about 40 to about 200 Å. Mesoporous as used herein means that there is a connected void structure throughout the GEL layer. Interstices in this size range provide a permeation path for molecules through the GEL layer. Molecules can permeate through these interstices because they are devoid of any material which would hinder mass transport during membrane use. Applicants believe that the size and shape of the zeolite crystals in the columnar zeolite layer is controlled by properties of the mesoporous growth enhancing layer (GEL). Controlling the morphology, orientation and shape of the zeolite crystals in the zeolite layer reduces the number of voids between crystals because the crystals pack together such that only grain boundary zones separate them (see FIGS. 4(a), 4(b) and 6). The GEL layer is believed to nucleate the formation of the dense mat of zeolite crystals grown on the surface of the GEL layer. This dense mat of crystals is closely packed together such that there exists at least one point between adjacent crystals of $\leq 20$ Å. As the zeolite layer grows from the interface at the GEL layer, crystal width may increase, however the individual crystals remain separated at their boundary zones by at least one point of spacing of $\leq 20$ Å. This densely packed mat is the columnar zeolite layer. Zeolite membranes grown without the use of the growth enhancing layer do not have the degree of perfection of the columnar membranes described herein.

Void as used herein means spaces between adjacent zeolite crystals in the columnar zeolite layer larger than 40 Å. The instant membranes are virtually free of voids in the columnar zeolite layer. Voids are at most about 1V %, preferably less than 0.1V % of the columnar zeolite layer. Voids can be detected from cross-sectional images of the columnar zeolite layer made in the scanning or transmission electron microscope. Defects are connected voids and are spaces between adjacent zeolite crystals extending through the thickness of the columnar zeolite layer. In the instant membrane, the total number of defects in the columnar zeolite layer with sizes >40 Å is <10,000 per square inch), preferably <100 per square inch. The number of defects larger than about 2000 Å is less than 10 per square inch, preferably less than 1 per square inch.

Isolated defects of the type described can be detected in dye permeation experiments. Isolated points at which dye permeates into the substrate reveal such defects. Defects can also be determined by examining cross-sections of the zeolites membranes in the scanning electron microscope. A cross sectional view showing a zeolite membrane which does not have any defects in the region examined is shown in FIG. 4. Gas permeation can also be used to reveal defects in the membrane. If the permeability of the zeolite layer to nitrogen at room temperature is less than $5\times 10^{-6}$ moles/(m$^2$-sec-Pascal) for each micron of thickness of the zeolite layer, the membrane can be considered to have an acceptable defect density. More preferably, the permeability of the zeolite layer to nitrogen at room temperature is less than $5\times 10^{-7}$ moles/(m$^2$-sec-Pascal) for each micron of thickness of the zeolite layer.

The new zeolite membrane architecture of the instant invention is composed of a substrate, a growth enhancing layer containing mesoporous interstices, and a layer of columnar zeolite crystals. The substrate on which the GEL layer is grown will be selected from porous and nonporous substrates. When a porous material is desired, it will be porous throughout its entire thickness. Preferably an inorganic oxide will be utilized. The porous substrate, hence can be a ceramic, metal, carbide, polymer or a mixture thereof. For example, alumina, titania, cordierite, mullite, stainless steel, pyrex, silica, silicon carbide, carbon graphite and silicon nitride or mixture thereof can be utilized. Preferably, stainless steel, alumina, and cordierite will be used. The porous substrate, hence may have a uniform pore size throughout or may be asymmetrical, having a larger pore structure throughout the bulk of the substrate with a smaller pore structure at the surface on which the GEL layer is to be grown. The substrate pore size is dictated by mass transfer considerations. It is preferred that the pore structure and thickness of the substrate be chosen such that the mass transfer resistance does not limit the flux of material permeating through the zeolite membrane during use. The porous substrate will hence display a porosity of about 5 to about 70%, preferably about 20 to about 50% and an average pore size of about 0.004 to about 2000 $\mu$m, preferably about 0.05 to about 50 microns. It is preferred that the surface of the porous surface on which the GEL layer is deposited be smooth. Roughness in the substrate leads to defects in the membrane. The substrate should have an average roughness with an amplitude of less than 10 $\mu$m with an aspect ratio of the roughness less than 1:1. It is preferable that the average roughness of the substrate be less 0.5 $\mu$m with an aspect ratio of the roughness less than 1:1. If a nonporous substrate is utilized, it may be selected from, e.g. quartz, silicon, glass, borosilicate glasses, dense ceramics, for example, clay, metals, polymers, graphite and mixtures thereof. When nonporous supports are utilized, the finished product can be used as a sensor.

The mesoporous growth enhancing layer is formed from a solution containing a nanocrystalline or colloidal zeolite or a mixture of metal oxide and nanocrystalline or colloidal zeolite or a mixture of nanocrystalline or colloidal zeolite and colloidal metal. Preferably, nanocrystalline or colloidal zeolite or a mixture of nanocrystalline or colloidal zeolite and metal oxide will be used to form the GEL layer. The metal oxides from which the GEL layer is prepared are colloidal metal oxides or polymeric metal oxides prepared from sold-gel processing. Nanocrystalline zeolites are crystallites having sizes from about 10 Å to 1 $\mu$m. Nanocrystalline zeolites can be prepared in accordance with the methods set forth in PCT-EP92-02386. Colloidal sized particles are between 50 and 10,000 Å and form a stable dispersion or solution of discrete particles. Preferably, the colloidal particles will be 250 to 5,000 Å, most preferably less than 1000 Å. Colloidal zeolites with sizes <5000 Å are readily obtainable. The solution for preparing the GEL layer is coated onto the surface of the porous substrate and calcined at temperatures $\leq 1000°$ C., preferably from about 200° to about 1000° C., most preferably 300°–600° C. Following calcination, a stable mesoporous growth enhancing layer is formed and is maintained in the final composition as a distinct layer having a thickness of about 0.1 to 20 microns, preferably about 1 to 5 microns. This layer contains interstices as described above. Following calcination the zeolite will be nanocrystalline or colloidal sized zeolite and the metal and metal oxide will be colloidal sized metal and metal oxide. The GEL layer can be formed from silica, silicates, aluminosilicates, aluminophosphates, silicoaluminophosphates, metalloaluminophosphates, metalloaluminophosphosilicates, and stanosilicates. Representative of molecular sieves (zeolites) which can be used include but are not limited to AFI, AEL, BEA, EUO, FER, KFI, MAZ, MOR, MEL, MTW, OFF, TON, FAU (includes zeolite X and zeolite Y), zeolite beta, LTA, LTL, AFS, AFY, APC, APD, MTN, MTT, AEL, CHA and MFI zeolites. Preferably, an MFI zeolite with a silicon to aluminum ratio greater than 30 will be used including compositions with no aluminum. MFI zeolites with Si/Al ratios greater than 30 are herein referred to as silicalite.

Some of the above materials, while not being true zeolites are frequently referred to in the literature as such, and the term zeolite will herein be used broadly to include such materials.

The metal oxides which can be used herein are selected from the group consisting of colloidal alumina, colloidal silica, colloidal zirconia, colloidal titania and polymeric metal oxides prepared from sol-gel processing and mixtures thereof. Preferably colloidal alumina will be used. The colloidal metals which can be used include copper, platinum and silver.

By adjusting the ratio of colloidal zeolite and metal oxide, the density of nucleation sites on the GEL can be controlled. This density controls the morphology of the zeolite film grown over the growth enhancing layer in a subsequent hydrothermal synthesis step. The higher the nucleation density, the narrower the zeolite crystal width the membrane will exhibit at the GEL columnar zeolite interface. Nucleation density can be controlled by the relative proportions of colloidal zeolites and metal oxides (with the density decreasing as the amount of the metal oxide utilized increases) as well as the size of the colloidal zeolites in the GEL. Colloidal sized zeolites in the range of from 50–10,000 Å are thus used in the GEL. The larger the colloidal zeolite crystals utilized in the GEL, the wider the zeolite columns in the membrane will be. Applicants believe that the addition of metal oxide, colloidal metal or mixtures thereof to the colloidal zeolite in the GEL layer provides spaces between nucleation sites allowing for control of the crystal width in the columnar zeolite layer.

GELs containing pure metal oxides or colloidal metal fail to produce the necessary nucleation sites. The formulation of GEL is 100−x wt % of colloidal metal or metal oxide: x wt % of colloidal zeolite, where x is at least 0.01 when the GEL is not formed from pure colloidal zeolite. Hence, the nucleation density is set by the above formula as well as the size of the particles of colloidal zeolite, colloidal metal and metal oxide. The smaller the particle size of the colloidal zeolite particles, the denser the nucleation sites which produces narrower columnar zeolite crystal widths.

The preferred synthesis technique used with this invention is the growth of columnar zeolite crystals on the face of a GEL layer which is oriented from 90 to 270 degrees in a synthesis mixture. In the 180 degree orientation, the preferred orientation, the GEL layer is horizontal and facing downward, thus being referred to as inverted. Applicants believe this prevents zeolites which are homogeneously nucleated in the synthesis mixture from settling by gravitation and incorporating into the growing columnar zeolite layer. Thus, the zeolite layer is not perturbed during the growth process. We refer to this synthesis technique as a Growth Enhancing Layer-Low Alkaline Inverted Insitu Synthesis Crystallization (GEL-LAI-ISC) process. The herein grown MFI zeolite membranes are optically transparent through the columnar zeolite layer thickness in that within this layer they do not scatter light.

The MFI zeolite membranes also show a significant crystallographic preferred orientation. Preferred orientation will be different depending on the zeolite chosen for the columnar zeolite layer. However, a preferred orientation will always be exhibited. The crystallographic orientation of the MFI zeolites is such that at least 75% of the crystals in the zeolite layer are aligned in an orientation with the c-axis parallel to the growth direction (within 15° preferably 5° of the normal to the surface of the zeolite layer), preferably at least 90% of the crystals will display the preferred orientation. The crystal width in the columnar zeolite layer can vary from 0.1 to 20 $\mu$m.

A measurement of the proportion of the crystals that have the longest axis normal to the zeolite layer (c-orientation) may be obtained by comparison of the x-ray diffraction pattern of the layer with that of a randomly oriented zeolite powder. In the case of an MFI zeolite, for example, the ratio of the intensity of the 002-peak to the combined 200 and 020 peak is divided by the same ratio for randomly oriented powder; the quotient is termed the crystallographic preferred orientation (CPO). Measured in this way, the columnar zeolite layers of the instant invention have a CPO of at least 2, and may have a CPO as high as $10^8$.

In preparing the GEL coated substrate onto which the columnar zeolite layer is to be grown, the substrate is first coated with the GEL followed by in-situ crystallization. The GEL smooths the porous substrate, facilitates the growth of the columnar zeolite layer and provides a seeding surface to increase the nucleation density of the zeolite crystals formed on the GEL. The GEL must be chemically and mechanically stable under the hydrothermal conditions employed during the preparation of the membrane and also capable of enhancing heterogenous nucleation or surface nucleation. Altering the density of nucleation sites changes the columnar zeolite crystal morphology by adjusting the width of the zeolite columns formed.

The GEL layer is produced from prepared solutions by a variety of solution coating techniques known in the art. For example, dip coating, spin coating, and slip casting, can be used. The coated substrate is then calcined at temperatures ranging from about 200° C. to about 1000° C. to form a stable mesoporous matrix. The preferred coating method is determined from the geometry of the substrate. In practical situations, a spin coating method can be used for disks or plates. Spin coating gives excellent control of the coating thickness. For tubular and honeycomb type substrates, a dipping process can be used. The GEL will be from about 0.1 to about 20 $\mu$m thick. The calcination time must be at least about 2 hours, preferably at least about 6 hours. Calcination of the GEL will typically be conducted with a heating rate of about 10° to 20° C./hour from room temperature to the calcination temperature. This is easily determined in the art. Preferably a dilute solution of a concentration of 0.1–10 wt % solids, more preferably 1 wt % solids will be used to produce the GEL.

The GEL coating solution may contain small amounts of organic binders such as PEG (polyethylene glycol), PVA (polyvinyl alcohol) or methyl cellulose. Once the substrate having the GEL coating is prepared, the columnar zeolite layer is then grown.

The hydrothermal treatment to form the crystalline zeolite upper layer is carried out by immersing the substrate carrying the intermediate layer in the synthesis mixture, and heating for a time and at the temperature sufficient to effect crystallization, e.g., in an autoclave under autogenous pressure. Heating times may be, for example, in the range of from 30 minutes to about 300 hours. Temperatures may be, for example, from 50° C. to about 300° C. and preferably about 180° C.

Immersion of the GEL coated substrate is carried out with the GEL layer in an orientation and location in the synthesis mixture such that the settling of particles produced in the reaction on the GEL layer, is minimized or prevented. For example, the surface to be GEL layer is advantageously at least 5 mm, and preferably at lest 8 mm, from a wall or, especially the base, of the vessel to avoid interference from particle settling. Alternatively, additional means to inhibit settling can be employed in the zeolite synthesis process.

In the preferred embodiment, the columnar layer is grown by suspending said porous substrate having said growth enhancing layer coated thereon in a zeolite synthesis mixture, and wherein said porous substrate is oriented such that said growth enhancing layer is oriented from 90° to 270° in said synthesis mixture and wherein said 180° orientation said growth enhancing layer is horizontal and facing downward, and wherein said growth enhancing layer is at least about 5 mm from the bottom, at the lowest point, of said zeolite synthesis mixture, autoclaving said substrate containing zeolite synthesis mixture for a time and at a temperature sufficient to form the columnar zeolite layer. For example, at about 50° to about 300° C., preferably about 100° to about 250° C. for at least about 30 minutes to form a columnar zeolite layer on said growth enhancing layer. Washing said GEL and zeolite coated substrate with water for a time and at a temperature sufficient to remove any unreacted zeolite synthesis mixture, preferably at a temperature of about 15° to about 100° C. for at least about 10 minutes, more preferably for at least about six hours. When the zeolite synthesis mixture contains an organic template, the membrane, following washing, is calcined at a temperature of about 400° to about 600° C. for at least about one hour. Longer calcination times will not affect membrane performance.

The columnar zeolite layer grown in accordance with the instant invention will have a thickness of about 0.1–100µ, preferably about 0.5 to 20 microns. Thickness is herein defined as the distance from the GEL zeolite layer interface to the uppermost point on the zeolite crystal.

The columnar zeolite layers of the instant invention are prepared from zeolite synthesis mixtures. Such mixtures are any mixtures from which zeolite crystals are grown and are well known in the art (see e.g., *Handbook of Molecular Sieves*, Rosemarie Szostak, Van Nostrand Reinhold, N.Y. 1992, *Zeolite Molecular Sieves*, D. W. Breck; R. E. Kreiger Publishing Co., Malaba, Fla., 1984 ISBN 0-89874-648-5.). The zeolites which can be utilized include those utilizable in the GEL layer. A preferred route for MFI zeolites is from a low alkaline synthesis mixture having a pH of about 8 to about 12 preferably about 9.5 to about 11, and from which MFI zeolite crystals can be grown. Such mixtures are readily prepared by those skilled in the art. For example, suitable mixtures include $Na_2O$, TPABr (tetrapropylammoniumbromide), $SiO_2$ and water. The membranes are grown by suspending the GEL coated porous substrate of choice in the low alkaline synthesis mixture. The synthesis mixture is then heated to about 50° to about 300° C., preferably about 180° C. for a period of about 30 minutes, preferably from about 30 minutes to about 300 hours. The columnar zeolite layer of the instant invention will preferably be that grown on the 90° to 270° oriented growth enhancing layer. Any growth on the substrate not on the GEL layer, can be easily removed by known techniques such as scraping or grinding, and is not part of this invention.

Once the columnar zeolite layer has been grown, the GEL coated substrate with attached columnar zeolite layer is washed with water at a temperature of about 15° to 100° C., preferably about 80° to about 100° C. for at least about 10 minutes, preferably for at least six hours. Excess washing for longer periods will not affect the membranes separation capabilities. The finished product is then referred to as a membrane.

Once washed, if the zeolite synthesis mixture contained an organic template the membrane is calcined to remove the template. For example, calcination in air or oxygen at about 400° to 600° C. can be used for at least about one hour. Longer calcination times will not affect the performance of the membrane. If no organic template is present, a drying step may optionally be conducted at temperatures of about 100° C.

Catalytic functions can be incorporated into the membranes. When a catalytic function is incorporated into the membrane, it can be used as an active element in a membrane reactor. Several different membrane reactor architectures can be constructed depending on the location of the catalystic site in the membrane. In one case the catalytic function can be located within the zeolite layer, while in another case the catalytic function can be located within the support, and in another case the catalytic function can be distributed throughout the support, GEL layer and the zeolite layer. In addition, catalytic function can be incorporated into a membrane reactor by locating conventional catalyst particles near one or more surfaces of the membrane such that specific products or reactants are continuously and selectively removed or added to the reaction zone throughout the membrane reactor. Impregnating with catalytically active metals such as Group VIII noble metals and particularly platinum, can impart the catalytic function to the membrane. The catalytically active metal can be incorporated into the membrane by techniques known to those skilled in the art such as the incipient wetness technique. The amount of Group VIII noble metal to be incorporated will range from 0.1 to about 10 wt %.

The membranes are useful for separation of normal alkanes from co-boiling hydrocarbons, especially $n-C_{10}$ to $C_{16}$ alkanes from kerosene, normal alkanes and alkenes from the corresponding branched alkane and alkene isomers; separation of aromatic compounds from one another, especially separation of $C_8$ aromatic isomers from each other, more especially paraxylene from a mixture of xylenes and, optionally, ethylbenzene, and separation of aromatics of different carbon numbers, for example, mixtures of benzene, toluene, and mixed $C_8$ aromatics; separation of aromatic compounds from aliphatic compounds, especially aromatic molecules with from 6 to 8 carbon atoms from $C_5$ to $C_{10}$ (naphtha range) aliphatics; separation of olefinic compounds from saturated compounds, especially light alkenes from alkane/alkene mixtures, more especially ethene from ethane and propene from propane; removing hydrogen from hydrogen-containing streams, especially from light refinery and petrochemical gas streams, more especially from $C_2$ and lighter components; and alcohols from aqueous streams. Also alcohols from other hydrocarbons, particularly alkanes and alkenes that may be present in mixtures formed during the manufacture of alcohols.

The zeolite layer of the invention may be employed as a membrane in such separations without the problem of being damaged by contact with the materials to be separated. Furthermore, many of these separations are carried out at elevated temperatures, as high as 500° C., and it is an advantage of the supported layer of the present invention that it may be used at such elevated temperatures.

The present invention accordingly also provides a process for the separation of a fluid mixture which comprises contacting the mixture with one face of a layer according to the invention in the form of a membrane under conditions such that at least one component of the mixture has a different steady state permeability through the layer from that of another component and recovering a component or mixture of components from the other face of the layer.

The invention further provides a process for catalysing a chemical reaction which comprises contacting a feedstock with a zeolite layer according to the invention which is in active catalytic form under catalytic conversion conditions and recovering a composition comprising at least one conversion product.

The invention further provides a process for catalysing a chemical reaction which comprises contacting a feedstock with one face of a zeolite layer according to the invention, that is in the form of a membrane and in active catalytic form, under catalytic conversion conditions, and recovering from an opposite face of the layer at least one conversion product, advantageously in a concentration differing from its equilibrium concentration in the reaction mixture. For example, a p-xylene rich mixture from the reactor or reactor product in a xylenes isomerization process; aromatic compounds from aliphatics and hydrogen in a reforming reactor; hydrogen removal from refinery and chemicals processes such as alkane dehydrogenation in the formation of alkenes, light alkane/alkene dehydrocyclisation in the formation of aromatics (e.g., Cyclar), ethylbenzene dehydrogenation to styrene.

The invention further provides a process for catalysing a chemical reaction which comprises contacting one reactant of a bimolecular reaction with one face of a layer according to the invention, that is in the form of a membrane and in active catalytic form, under catalytic conversion conditions, and controlling the addition of a second reactant by diffusion from the opposite face of the layer in order to more precisely control reaction conditions. Examples include: controlling ethylene, propylene or hydrogen addition to benzene in the formation of ethyl benzene, cumene or cyclohexane respectively.

Some specific reaction systems where these membranes would be advantageous for selective separation either in the reactor or on reactor effluent include: selective removal of a Para-Xylene rich mixture from the reactor, reactor product, reactor feed or other locations in a Xylenes isomerization process; selective separation of aromatics fractions or specific aromatics molecule rich streams from catalytic reforming or other aromatics generation processes such as light alkane and alkene dehydrocyclization processes (e.g., $C_3$–$C_7$ paraffins to aromatics from processes such as Cyclar), methanol to gasoline and catalytic cracking processes; selective separation of benzene rich fractions from refinery and chemical plant streams and processes; selective separation of olefins or specific olefin fractions from refinery and chemicals processing units including catalytic and thermal cracking, olefins isomerization processes, methanol to olefins processes, naphta to olefins conversion processes, alkane dehydrogenation processes such as propane dehydrogenation to propylene; selective removal of hydrogen from refinery and chemicals streams and processes such as catalytic reforming, alkane dehydrogenation, catalytic cracking, thermal cracking, light alkane/alkene dehydrocyclization, ethylbenzene dehydrogenation, paraffin dehydrogenation; selective separation of molecular isomers in processes such as butane isomerization, paraffin isomerization, olefin isomerization, selective separation of alcohols from aqueous streams and/or other hydrocarbons.

The following examples are for illustration and are not meant to be limiting.

EXAMPLES

Materials

The following reagents were used in preparing GEL coatings: colloidal alumina solution, colloidal titania prepared from a sol-gel process, colloidal silicalite solutions, and distilled water. Several batches of colloidal silicalite solutions prepared in accordance with PCT-EP92-02386 were used for the preparation of GEL coatings. More information on these solutions are shown below:

| Batch No. | Silicalite(MFI) Synthesis Temp. °C. | Silicalite(MFI) Washed | Final Silicalite(MFI) Solution pH | Solids (%) | Particle Size (nm) |
|---|---|---|---|---|---|
| 1 | 68 | yes | 10.3 | 8.7 | ~50 |
| 2 | 50 | no | >13 | ~9 | ~50 |
| 3 | 81 | yes | 9.9 | 9.1 | ~90 |
| 4 | 50 | no | >13 | ~9 | ~60 |
| 4 | 50 | yes | ~10 | ~9 | ~60 |

Remarks

1. All suspensions were prepared from the same type of synthesis solutions with the same raw materials.

2. Batch 4 was a duplication of 2. The solids content of batches 2 and 4 were calculated assuming 55% conversion of amorphous silica to zeolite. The actual solids content of these 2 unwashed samples is of course higher, e.g. for 4 the solids content (evaporation to dryness) was 23.3 wt %, but this includes zeolite, amorphous silica and residual TPAOH-NaOH.

Porous alumina and stainless steel substrates were used for the support of GEL and zeolite coatings. The average pore size and porosity of the alumina is about 800 Å and 32%, respectively. Porous sistered stainless steel substrates from Mott's (0.25 $\mu$m) and Pall's (MO2O, 2 $\mu$m) were obtained. All the substrates were cleaned with acetone in an ultra-sonic bath, dried at 120° C. and then cooled down to room temperature before use.

GEL Coating

In general, a dilute solution is preferred to produce a high quality growth enhancing layer. Dilution with distilled water to obtain a solids concentration less than 1 wt % is generally preferred. Colloidal silicalites and metal oxides are first diluted separately with distilled water to the concentration of 0.5 wt %. The diluted colloidal silicalite solution was slowly added into the desired amount of metal oxide solution with continuous stirring. The resulting solutions with the desired wt % of colloidal silicalite and metal oxide were then degased for 15 minutes to remove the trapped air in solutions.

The substrates were then spin coated with these solutions at 4000 rpm and calcined at 500° C. for 6 hours in air. The heating rate was controlled at 20° C./hr.

Hydrothermal Reaction

The hydrothermal experiments were performed using mixtures of the following reagents: NaOH (Baker), Al(NO3)3.9H2O (Baker), Ludox AS-40 (Dupont), tetrapropylammonium bromide (98%, Aldrich), and distilled water.

MFI membranes were prepared from two different reaction batch mixtures, one containing silica only to make high silica MFI and the other with added alumina to make ZSM-5. They have the general formulation $xM_2O:10\ SiO_2:z\ Al_2O_3:p\ TPABr:yH_2O$; M can be Na, Li, K, Rb, and Cs, x was varied from 0.1 to 0.5, and y varied from 50 to 3000, z varies from 0 to 0.15, and p varies from 0.2 to 1. All the results shown in the next section have the composition of $0.22\ Na_2O:10\ SiO_2:0\ Al_2O_3:280\ H_2O:0.5\ TPABr$ with the exception of the ZSM-5 sample which contained 0.05 $Al_2O_3$ for ZSM-5 sample. The 1.74 g of TPABr and 0.45 g of NaOH (50 wt %) were dissolved in 52 ml of distilled water with stirring. To this solution, 18.8 g of Ludox AS-40 was then added with agitation for at least 15 minutes until a uniform solution was formed.

Substrates with GEL coating were placed inverted (180° orientation) in a Teflon lined autoclave by supporting them on the stainless steel wire frame. The distance between the substrate and the bottom of autoclave reactor was at least 5 mm. The synthesis solution was then poured into the reactor to cover the whole substrate. The autoclave was sealed and placed in an oven, which was preheated at the desired temperature. The autoclaves were removed from the oven after reaction and cooled to room temperature. The coated substrates were washed with hot water for at least 6 hours, then calcined at 500° C. for 6 hours in air. The heating rate was controlled at 10° C./hour.

Analysis

The resulting membranes were characterized by x-ray diffraction, electron microscopy, dye test and permeability measurements.

Results and Discussion

Products

Figure 4B:
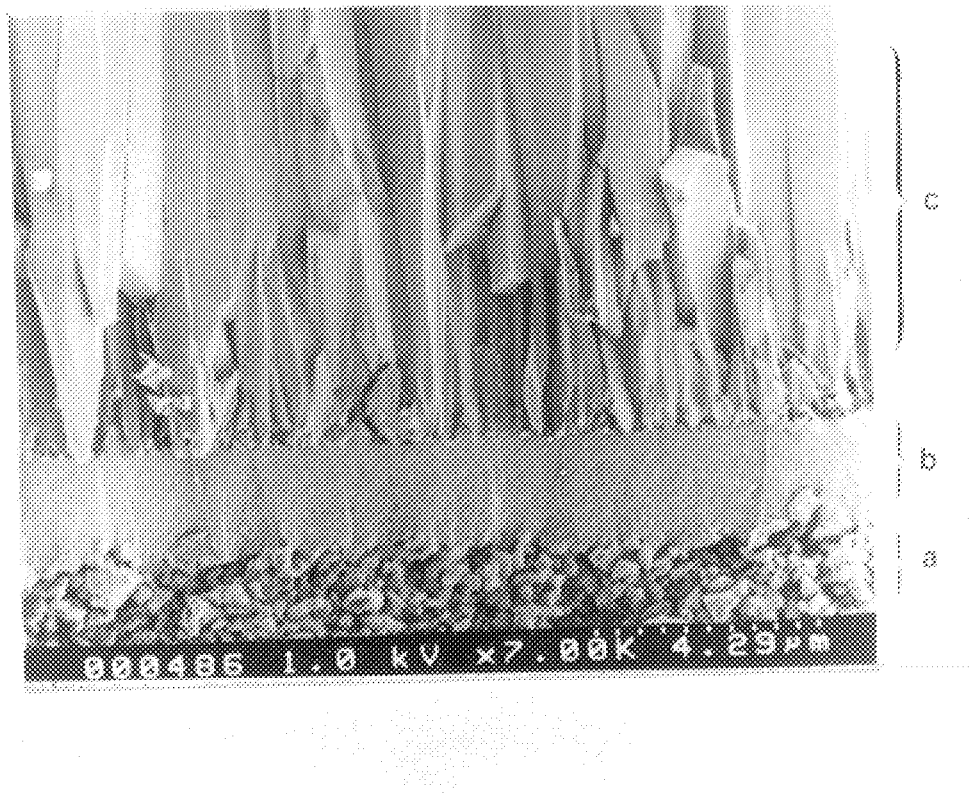
FIG. 4(b) shows a scanning electron micrograph of the same composition as FIG. 4(a) only at higher magnification in which more detail about the interfaces between layers (A), (B) and (C) can be seen.
Figure 5:
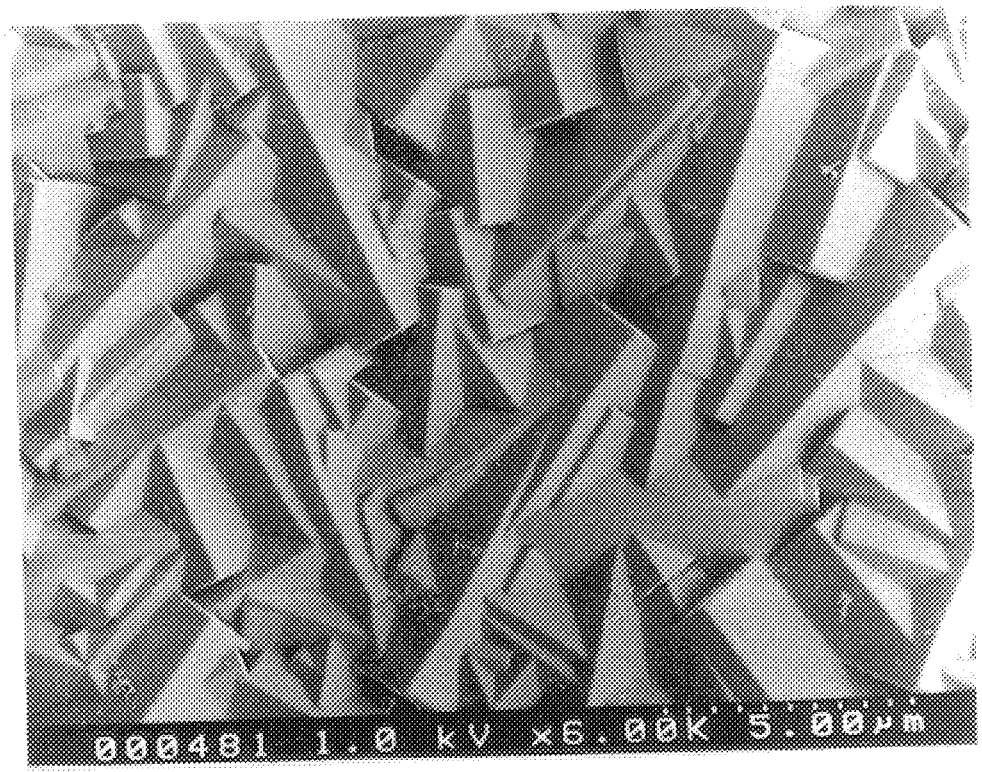
FIG. 5 shows a scanning electron micrograph of the exterior surface of a membrane of the instant invention. The surface shown is an intergrown dense mat of zeolite crystals which are free of defects extending through the thickness of the layer.

The following table shows some typical examples synthesized under different experimental conditions, such as GEL composition, reaction time, and substrate.

membrane. FIG. 4a shows the zeolite layer (C), the growth enhancing layer (B) and porous support (A). The major part of FIG. 4a shows the continuous growth of zeolite that completely covers the surface of the GEL layer. The formation of a columnar structure in the zeolite layer is apparent. The width of the columns right on the growth enhancing layer is very narrow and becomes larger and larger as the layer grows. As such, the cross-sectional area of the grains increases upwards in the layer. The columnar nature of the microstructure is consistent with the x-ray powder diffraction pattern. In FIG. 5, it is clear that zeolite surface consists of a continuous array of densely packed zeolite crystals, which are <10 μm in width.

Effect of the Density of Nucleation Sites Upon the Width of MFI Crystals

The width of the zeolite crystal columns in sample #5 were smaller than those in sample #6 which has a lower density of nucleation sites in its GEL due to the addition of colloidal alumina. The morphology was similar, but the grain size is much larger in sample #6 than in #5. Thus, by simply controlling nucleation density the width of the zeolite crystals in the zeolite layer.

Effect of Substrates Used Upon the Morphology of the MFI Crystals

Sample #9 grown on a stainless steel as substrate is very similar in morphology to the membrane fabricated on an

| Sample | Substrate | GEL Composition | Reaction Temp °C. | Reaction Time Hrs. | Zeolite Layer Thickness μm | Result |
|---|---|---|---|---|---|---|
| 1 | alumina | a | 165 | 18 | 18 | CPO MFI |
| 2 | alumina | a | 165 | 90 | 81 | CPO MFI |
| 3 | alumina | b | 180 | 18 | 22 | CPO MFI |
| 4 | alumina | c | 180 | 18 | 22 | CPO MFI |
| 5 | alumina | a | 180 | 18 | 28 | CPO MFI |
| 6 | alumina | d | 180 | 18 | 21 | CPO MFI |
| 7 | alumina | e | 180 | 20 | 30 | CPO MFI |
| 8 | alumina | f | 180 | 18 | 23 | CPO MFI |
| 9 | SS | a | 180 | 24 | 40 | CPO MFI |

CPO = crystallographic preferred orientation
@ alumina: 0.08 μm pore size; SS = stainless steel, Pall Corporation, PMM Grade MO2O
a. 100 wt % unwashed solution (batch 2)
b. 100 wt % washed solution (batch 1)
c. 50 wt % washed solution (batch 1); 50 wt % alumina
d. 50 wt % unwashed solution (batch 2); 50 wt % alumina
e. 10 wt % unwashed solution (batch 4); 90 wt % alumina
f. 100 wt % washed solution (batch 3)

General Observations

The x-ray diffraction pattern inverted zeolite membrane grown on a GEL coated substrate (LAI-GEL-ISC) were observed. Reflections of MFI type zeolite were identified in all diagrams. No zeolite second phase was observed. The only lines in the patterns not associated with the zeolite identified with the porous support. The pattern associated with the GEL-LAI-ISC membrane was dramatically different from that of MFI powder. It is seen that the MFI crystal layer prepared from GEL-LAI-ISC exhibits pronounced 00 l peaks with no other significant zeolite peaks occurring in the pattern. This is strong evidence that a preferred orientation of (00 l) directions parallel to the growth direction exists in the membrane. Another way of saying this is that the MFI crystal layer in GEL-LAI-ISC membranes shows very strong orientation with the c-axis normal to the GEL layer.

FIG. 5 shows a plan view of a typical GEL-LAI-ISC membrane (sample #2). The cross-packed top surface and columnar cross-sectional morphologies were observed in the alumina substrate. The MFI crystal formation seems independent of the substrate used.

Dye Permeation Test

The absence of defects in the MFI zeolite layer was measured by its inability to pass dye molecules into the porous substrate. Any dye which wicks into the substrate is readily visible because of a color change in the substrate. Rhodamine B (0.5 wt %) in methanol defects is added to the center of a dried membrane to coat the surface. Approximately 2–3 drops were applied to a 1 inch membrane and allowed to set for ~30 seconds before the excess dye was blotted off. Methanol was then blotted on the membrane to remove any excess Rhodamine B solution on the membrane. The membrane was then washed with methanol for 10–30 seconds. Any permeation of the dye into the substrate through defects in the membrane is then readily apparent.

Methanol permeated into the substrate, however, no Rhodamine B dye was observed in the substrate indicating that the membrane is capable of performing dye separations.

When the membrane is synthesized from a zeolite synthesis mixture containing an organic template, the dye test is performed after calcination.

If a non-ceramic substrate is utilized, methods other than visual examination are used to detect wicking into the membrane.

What is claimed is:

1. A zeolite membrane which exhibits a columnar cross-sectional morphology and preferred crystallographic orientation comprising a substrate having coated thereon a mesoporous growth enhancing layer and a dense layer of columnar zeolite crystals on said mesoporous growth enhancing layer, and wherein said mesoporous growth enhancing layer comprises zeolites; zeolite and metal oxide; zeolite and colloidal sized metal; or zeolite, colloidal sized metal and metal oxide, and wherein said zeolites are selected from the group consisting of nanocrystaline zeolites and colloidal sized zeolites, and wherein said substrate is selected from the group consisting of porous and nonporous substrates, and wherein said mesoporous growth enhancing layer has interstices of about 20 to about 2000 Å, and wherein said columnar zeolite layer is a polycrystalline layer, wherein 99% of said columnar zeolite crystals have at least one point between adjacent crystals that is $\leq 20$ Å.

2. A zeolite membrane according to claim 1 wherein when said substrate is a porous substrate, it has a porosity of about 10 to about 70% and a pore size distribution of about 0.004 to about 100 $\mu$m.

3. A zeolite membrane according to claim 2 wherein said porous substrate is selected from stainless steel, pyrex, ceramic, alumina, titania, cordierite, mullite, silicon carbide, silicon nitride, carbon, graphite and mixtures thereof.

4. A zeolite membrane according to claim 2 wherein said porous substrate has an average roughness with an amplitude of <10 $\mu$m with an aspect ratio of a roughness <1:1.

5. A zeolite membrane according to claim 1 wherein said growth enhancing layer is about 0.1 to about 20 $\mu$m thick.

6. A zeolite membrane according to claim 1 wherein said zeolite crystals of said zeolite layer and said zeolite of said growth enhancing layer are selected from the group consisting of silica, silicates, aluminosilicates, aluminophosphates, silicoalumino phosphates, metallo alumino phosphates, metallo alumino phosphosilicates and stanosilicates.

7. A zeolite membrane according to claim 6 and said zeolite crystals of said zeolite layer wherein said zeolites of said growth enhancing layer are selected from zeolite X, zeolite Y, zeolite beta, MFI zeolite, silicalite, LTA, LTL, CHA, AFI, AEL, BEA, EUO, FER, KFI, MAZ, MOR, MEL, MTW, OFF, TON, FAU, AFS, AFY, APC, APD, MTN, MTT, AEL and mixtures thereof.

8. A zeolite membrane according to claim 1 wherein said metal oxide of said growth enhancing layer is selected from the group consisting of colloidal sized alumina, silica, titania, zirconia, and mixtures thereof.

9. A zeolite membrane according to claim 1 wherein said colloidal sized metal is selected from the group consisting of copper, platinum, silver and mixtures thereof.

10. A zeolite membrane according to claim 1 wherein said membrane has <1V % voids.

11. A zeolite membrane according to claim 10 wherein said membrane has less than 0.1V % voids.

12. A zeolite membrane according to claim 1 wherein said membrane has <10,000 defects per square inch of >40 Å.

13. A zeolite membrane according to claim 1 wherein said layer of columnar zeolite crystals are about 0.1 to about 20 $\mu$m in width and about 1 to 100$\mu$ thick.

14. A zeolite membrane according to claim 1 wherein said nanocrystalline zeolites in said growth enhancing layer are from about 10 Å to about 1 $\mu$m in size and said colloidal sized zeolites in said growth enhancing layer are from about 50 Å to about 1 $\mu$m.

15. A zeolite membrane according to claim 1 wherein said metal oxide and said colloidal sized metal are present in an amount of from 99.99 wt % to about 0.01 wt %.

16. A zeolite membrane according to claim 1 wherein when said columnar zeolite crystals are MFI crystals, they have a c orientation within 15 degrees of normal to the surface of said columnar zeolite layer.

17. A zeolite membrane according to claim 1 wherein when said substrate is a non-porous substrate said substrate is selected from the group consisting of quartz, silicon, glass, borosilicate glasses, clay, metal, polymer, graphite, dense ceramic and mixtures thereof.

18. A zeolite membrane according to claim 1 wherein said zeolite membrane has incorporated therein about 0.1 wt % to about 10 wt % Group VIII noble metal.

19. A process for preparing a zeolite membrane exhibiting a columnar cross-sectional morphology and preferred crystallographic orientation comprising the steps of:

(a) coating a substrate with a growth enhancing layer wherein said growth enhancing is prepared by utilizing a solution comprising distilled water with zeolite, zeolite and metal oxide, zeolite and colloidal metal, or zeolite, colloidal metal and metal oxide wherein said zeolite is selected from the group consisting of nanocrystalline zeolite and colloidal zeolite, and wherein said metal oxide is colloidal metal or metal oxide prepared from sol-gel processing, followed by calcination at a temperature of about 200° to about 1000° C. for about at least about 2 hours, said solution for preparing said growth enhancing layer being a solution having a concentration of 0.1 to 10 wt. % solids, provided that said coating step (a) is performed by dipping said substrate when said substrate is a tubular or honeycomb substrate and spin coating said substrate when said substrate is a disk or plate substrate;

(b) immersing said substrate having said growth enhancing layer coated thereon in a zeolite synthesis mixture wherein said substrate is oriented such that said growth enhancing layer is oriented from 90° to 270° C. in said synthesis mixture and wherein in said 180° orientation said growth enhancing layer is horizontal and facing downward, and wherein said growth enhancing layer is at least about 5 mm from the bottom of said alkaline synthesis mixture;

(c) autoclaving said substrate containing zeolite synthesis mixture for a time and at a temperature sufficient to form a columnar zeolite layer on said growth enhancing layer and wherein settling of particles from said zeolite synthesis mixture during autoclaving onto said columnar zeolite layer is prevented;

(d) washing said substrate having said growth enhancing layer and columnar zeolite layer thereon with a solution comprising water for a time and at a temperature sufficient to remove unreacted zeolite synthesis mixture to form a membrane, provided that when said zeolite synthesis mixture contains an organic template said membrane is calcined at a temperature ranging from about 400° C. to about 600° C. for at least about one hour.

20. A process according to claim 19 wherein the width of the crystals in said columnar zeolite layer is increased by increasing the amount of colloidal metal or metal oxide in step (a).

21. A method for separating normal alkanes from co-boiling hydrocarbons comprising contacting a mixture of normal alkanes with a porous substrate having coated thereon a mesoporous growth enhancing layer and a layer of columnar zeolite crystals on said mesoporous growth enhancing layer, and wherein said mesoporous growth enhancing layer comprises nanocrystalline or colloidal sized zeolites, nanocrystalline or colloidal sized zeolite and metal oxide, or nanocrystalline or colloidal sized zeolites and colloidal metals, or nanocrystalline or colloidal sized zeolite, colloidal metal and metal oxide, and wherein said mesoporous growth enhancing layer has interstices of about 20 to about 2000 Å, and wherein said columnar zeolite layer is a polycrystalline layer, wherein 99% of said columnar zeolite crystals have at least one point between adjacent crystals that is <20 Å.

22. A method for separating aromatic compounds comprising contacting a mixture of aromatic compound with a porous substrate having coated thereon a mesoporous growth enhancing layer and a layer of columnar zeolite crystals on said mesoporous growth enhancing layer, and wherein said mesoporous growth enhancing layer comprises nanocrystalline or colloidal sized zeolites, nanocrystalline or colloidal sized zeolite and metal oxide, or nanocrystalline or colloidal sized zeolites and colloidal metals, or nanocrystalline or colloidal sized zeolite, colloidal metal and metal oxide, and wherein said mesoporous growth enhancing layer has interstices of about 20 to about 2000 Å, and wherein said columnar zeolite layer is a polycrystalline layer, wherein 99% of said columnar zeolite crystals have at least one point between adjacent crystals that is $\leq 20$ Å.

23. A process according to claim 22 wherein said mixture of aromatic compound is a mixture of xylenes.

24. A method for separating aromatic from aliphatic compounds comprising contacting a mixture of aromatic compounds and aliphatic compounds with a porous substrate having coated thereon a mesoporous growth enhancing layer and a layer of columnar zeolite crystals on said mesoporous growth enhancing layer, and wherein said mesoporous growth enhancing layer comprises nanocrystalline or colloidal sized zeolites, nanocrystalline or colloidal sized zeolite and colloidal metal oxide, or nanocrystalline or colloidal sized zeolites and colloidal metals, or nanocrystalline or colloidal sized zeolite, colloidal metal and metal oxide, and wherein said mesoporous growth enhancing layer has interstices of about 20 to about 2000 Å, and wherein said columnar zeolite layer is a polycrystalline layer, wherein 99% of said columnar zeolite crystals have at least one point between adjacent crystals that is $\leq 20$ Å.

25. A method for separating hydrogen from hydrogen containing streams comprising contacting a hydrogen containing stream with a porous substrate having coated thereon a mesoporous growth enhancing layer and a layer of columnar zeolite crystals on said mesoporous growth enhancing layer, and wherein said mesoporous growth enhancing layer comprises nanocrystalline or colloidal sized zeolites, nanocrystalline or colloidal sized zeolite and colloidal metal oxide, or colloidal sized nanocrystalline or colloidal sized zeolites and colloidal metals, or nanocrystalline zeolite, colloidal metal and metal oxide, and wherein said mesoporous growth enhancing layer has interstices of about 20 to about 2000 Å, and wherein said columnar zeolite layer is a polycrystalline layer, wherein 99% of said columnar zeolite crystals have at least one point between adjacent crystals that is $\leq 20$ Å.

26. A process for separating olefinic compounds from saturated compounds comprising contacting a mixture of olefinic compounds and saturated compounds with a zeolite membrane comprising a porous substrate having coated thereon a mesoporous growth enhancing layer and a layer of columnar zeolite crystals on said mesoporous growth enhancing layer, and wherein said mesoporous growth enhancing layer comprises nanocrystalline or colloidal sized zeolites, nanocrystalline or colloidal sized zeolite and colloidal metal oxide, nanocrystalline or colloidal sized zeolites and colloidal metals, or nanocrystalline or colloidal sized zeolite, colloidal metal and metal oxide, and wherein said mesoporous growth enhancing layer has interstices of about 20 to about 2000 Å, and wherein said columnar zeolite layer is a polycrystalline layer, wherein 99% of said columnar zeolite crystals have at least one point between adjacent crystals that is $\leq 20$ Å.

* * * * *